United States Patent
Douguet et al.

(10) Patent No.: US 8,233,615 B2
(45) Date of Patent: Jul. 31, 2012

(54) MODULAR REDUCTION USING A SPECIAL FORM OF THE MODULUS

(75) Inventors: Michel Douguet, Marseilles (FR); Vincent Dupaquis, Biver (FR)

(73) Assignee: Inside Secure, Aix-en-Provence (FR)

( * ) Notice: Subject to any disclaimer, the term of this patent is extended or adjusted under 35 U.S.C. 154(b) by 1163 days.

(21) Appl. No.: 12/033,512

(22) Filed: Feb. 19, 2008

(65) Prior Publication Data

US 2009/0180609 A1 Jul. 16, 2009

Related U.S. Application Data

(60) Provisional application No. 61/021,152, filed on Jan. 15, 2008.

(51) Int. Cl.
*H04L 29/06* (2006.01)
(52) U.S. Cl. .......................................... 380/28; 708/491
(58) Field of Classification Search .................. 380/28; 708/491
See application file for complete search history.

(56) References Cited

U.S. PATENT DOCUMENTS

| | | | |
|---|---|---|---|
| 6,366,673 B1 | 4/2002 | Hollmann et al. | |
| 6,873,706 B1 | 3/2005 | Miyazaki et al. | |
| 6,876,745 B1 | 4/2005 | Kurumatani | |
| 7,046,801 B2 | 5/2006 | Okeya | |
| 7,162,033 B1 | 1/2007 | Coron | |
| 2004/0228478 A1 | 11/2004 | Joye | |
| 2005/0105723 A1 | 5/2005 | Dupaquis et al. | |
| 2005/0147240 A1* | 7/2005 | Agrawal et al. ................. | 380/28 |
| 2005/0152541 A1 | 7/2005 | Takenaka et al. | |
| 2005/0169462 A1 | 8/2005 | Jung et al. | |
| 2005/0169463 A1* | 8/2005 | Ahn et al. ...................... | 380/28 |
| 2005/0195973 A1 | 9/2005 | Ibrahim | |
| 2005/0207571 A1* | 9/2005 | Ahn et al. ...................... | 380/28 |
| 2006/0029221 A1 | 2/2006 | Ibrahim | |
| 2006/0075485 A1* | 4/2006 | Funahashi et al. ............. | 726/19 |
| 2006/0093137 A1 | 5/2006 | Izu et al. | |
| 2006/0098814 A1 | 5/2006 | Al-Khoraidly et al. | |
| 2006/0280296 A1 | 12/2006 | Vasyltsov et al. | |
| 2007/0055879 A1 | 3/2007 | Luo et al. | |

(Continued)

FOREIGN PATENT DOCUMENTS

WO WO 2006/124160 A2 11/2006

OTHER PUBLICATIONS

Hasenplaugh, W., et al. (2007) "Fast Modular Reduction". Gunnar Gaubatz, Vinodh Gopal;pp. 225-229, 18th IEEE Symposium on Computer Arithmetic.*

(Continued)

*Primary Examiner* — Vivek Srivastava
*Assistant Examiner* — Michael D Anderson
(74) *Attorney, Agent, or Firm* — Fish & Richardson P.C.

(57) ABSTRACT

A special form of a modulus and a modified Barrett reduction method are used to perform modular arithmetic in a cryptographic system. The modified Barrett reduction is a method of reducing a number modulo another number without the use of any division. By pre-computing static values used in the Barrett reduction method and by using a special form of the modulus, the calculation of reducing a number modulo another number can be reduced. This can result in a decrease in computation time, speeding up the overall cryptographic process.

34 Claims, 5 Drawing Sheets

U.S. PATENT DOCUMENTS

| | | |
|---|---|---|
| 2007/0064931 A1 | 3/2007 | Zhu et al. |
| 2007/0083586 A1 | 4/2007 | Luo et al. |
| 2007/0162530 A1 | 7/2007 | Dhen |
| 2007/0177721 A1 | 8/2007 | Itoh et al. |
| 2008/0019509 A1 | 1/2008 | Al-Gahtani et al. |
| 2008/0025500 A1 | 1/2008 | Izu et al. |
| 2008/0205638 A1 | 8/2008 | Al-Gahtani et al. |
| 2008/0273695 A1 | 11/2008 | Al-Gahtani et al. |
| 2009/0074179 A1 | 3/2009 | Futa et al. |

OTHER PUBLICATIONS

Phatak et al., "Fast Modular Reduction for Large Wordlengths via One Linear and One Cyclic Convolution." Computer Arithmetic, 17th IEEE Symposium on Cape Cod, 179-186, 2005.*

Dhem, J-F, "Modular Multiplication." Design of an Efficient Public-Key Cryptographic Library for RISC-based Smart Cards, Chapter 2, pp. 11-56, 2008.*

K. Ananyi and D. Rakhmatov "Design of a reconfigurable processor for NIST prime field ECC", Proc. IEEE Symp. Field-Program. Custom Comput. Mach., p. 333 , 2006.*

FIPS Pub 186-2; U.S.Doc/NIST:Digital Signature Standard (DSS). Jan. 27, 2000.*

Hasenplaugh, W., et al. (2007) "Fast Modular Reduction". Gunnar Gaubatz, Vinodh Gopal; pp. 225-229, 18th IEEE Symposium on Computer Arithmetic.

Efficient Implementation USC Computer Science Department, unknown date.

Crandall J. & Papadopoulos J. (2003) "On the implementation of AKS-class primality tests" . [Retrieved from internet <URL http://www.apple.com/acg/pdf/aks3.pdf>.

Deschamps, J-P. and Sutter, G. (2007) "Comparison of FPGA Implementation of the Mod $M$ Reduction." Latin American Applied Research, pp. 93-97.

U.S. Appl. No. 12/028,427, filed Feb. 8, 2008, Douguet et al.

Cohen et al., "Efficient Elliptic Curve Exponentiation Using Mixed Coordinates." Internat. Conf. on the Theory and Appl. of Cryptology and Infor. Security, pp. 51-65, 1988.

Coron, J.-S. "Resistance Against Differential Power Analysis for Elliptic Curve Crytosystems." Cryptographic Hardware and Embedded Sys. Computer Sci., 1717, pp. 292-302,1999.

Okeya and Sakurai, "Power Analysis Breaks Elliptic Curve Cryptosystems Even Secure Against the Timing Attack." Prog in Cryptology-Indocrypt, Inter Conf Incrypt, 178-190, 2000.

Joye et al., "Protections Against Differential Analysis for Elliptic Curve Cryptography—An Algebraic Approach—." Cryptographic Hardware & Embedded Sys., 377-390, 2001.

Joye "Elliptic Curves and Side-Channel Attacks" Séminaire de Cryptographie, Rennes, 1-7, 2003 [on-line]. [Retrieved from the internet <URL http://www.gemplus.com/smart/>.

Dupuy, W. & Kunz-Jacques, S. "Resistance of Randomized Projective Coordinates Against Power Analysis." DCSSI Crypto Lab, (27 pages) 2005.

Atmel Corporation, International Search Report and the Written Opinion of the corresponding PCT application No. PCT/US2009/030869 (14 pages) dated May 8, 2009.

Notification Concerning Transmittal of International Preliminary Report on Patentability for PCT/US2009/030869, dated Jul. 29, 2010, 7 pages.

Notification Concerning Transmittal of International Preliminary Report on Patentability for PCT/US2009/030867, filed Jul. 29, 2010, 7 pages.

* cited by examiner

MODULAR REDUCTION USING A SPECIAL FORM OF THE MODULUS

This application claims the benefit of priority of U.S. Provisional Application Ser. No. 61/021,152, filed on Jan. 15, 2008, the entire disclosure of which is incorporated herein by reference.

TECHNICAL FIELD

The subject matter of this application is generally related to cryptography.

BACKGROUND

Cryptographic processes are subject to "side-channel" attacks (e.g., power and electromagnetic analysis attacks) that exploit information leaked into the operating environment of a device while the device executes cryptographic algorithms. For example, a hacker may monitor the power consumed or the electromagnetic radiation emitted by a device (e.g., a smart card), while it performs private-key operations such as decryption and signature generation. The hacker may also measure the time it takes to perform a cryptographic operation, or analyze how a cryptographic device behaves when certain errors are encountered. Some conventional countermeasures to side-channel attacks insert "dummy" cryptographic operations (e.g., doubling, addition), so that the operations cannot be distinguished from each other when viewed on a power trace, for example. Inserting additional "dummy" operations, however, slows down the overall cryptographic process, which may be unacceptable for certain applications.

SUMMARY

A Barrett reduction is a method of reducing a number modulo another number without the use of any division. The Barrett reduction method, when used to reduce a single number, can be slower than a divide algorithm. By pre-computing static values used in the Barrett reduction method and by using a special form of the modulus, the calculation of reducing a number modulo another number can be reduced. This can result in a decrease in computation time, speeding up the overall cryptographic process.

Other implementations of modular reduction using a special form of the modulus for operations used in cryptographic processes are disclosed, including implementations directed to systems, methods, processes, apparatuses and computer-readable mediums.

DETAILED DESCRIPTION

Example Cryptographic System & Process

Figure 1:
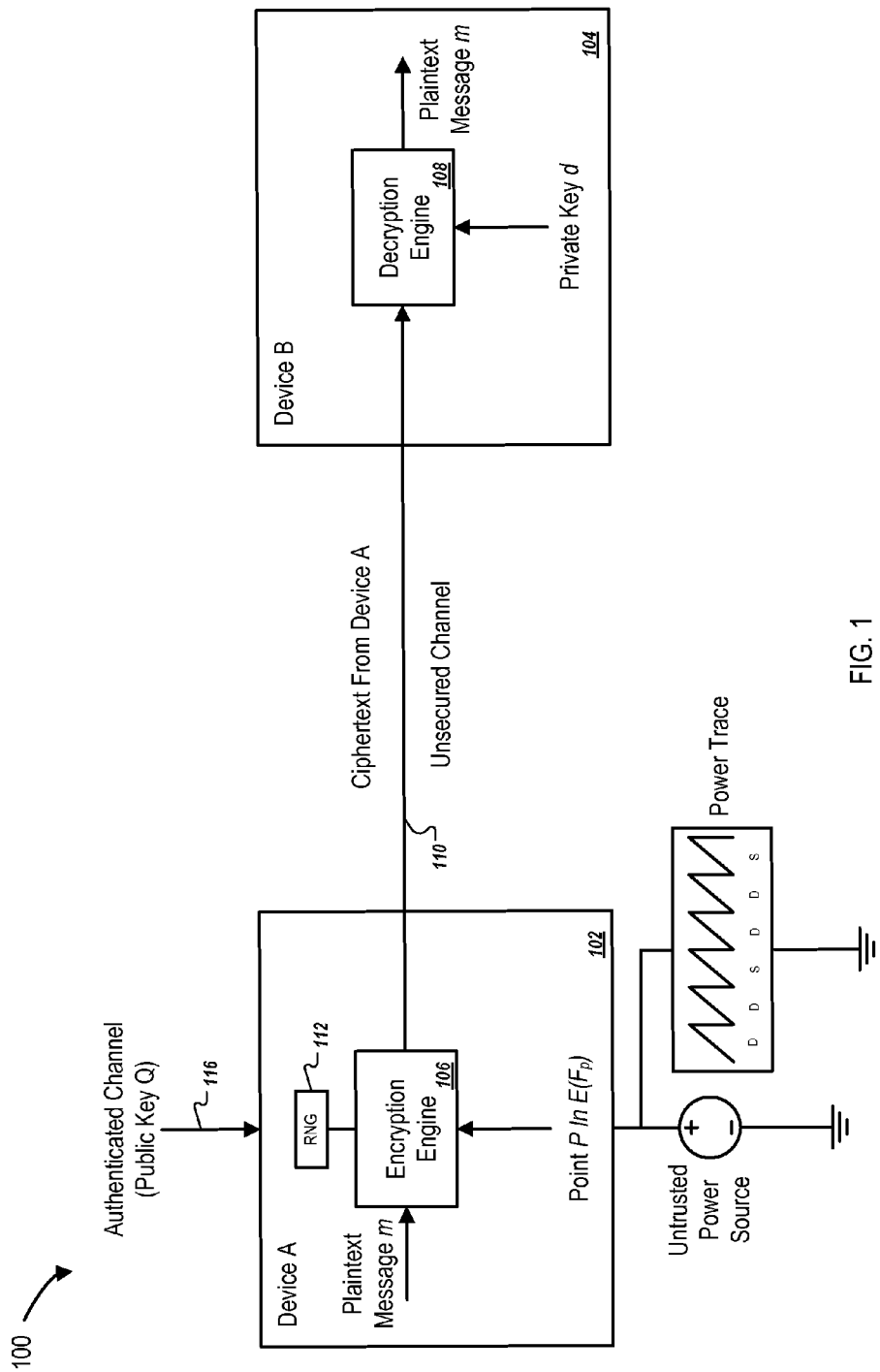
FIG. 1 is a block diagram of an implementation of a public key cryptographic system.

FIG. 1 is a block diagram of an implementation of a public key cryptographic system 100. The system 100 includes device 102 ("Device A") and device 104 ("Device B"). In the example shown, device 102 can communicate with device 104 over an unsecured channel 110. For example, device 102 can send a message over the unsecured channel 110 to device 104. Devices 102 and 104 can be any device capable of performing cryptographic processes, including but not limited to: a personal computer, a mobile phone, an email device, a game console, a personal digital assistant (PDA), etc. An unsecured channel 110 can be any communication medium, including but not limited to: radio frequency (RF) carriers, optical paths, circuit paths, networks (e.g., the Internet), etc.

In some implementations, the device 102 includes an encryption engine 106 and a random number generator 112. The random number generator 112 can generate true random numbers (e.g., generated from a physical process) or pseudo random numbers (e.g., generated from an algorithm). In other implementations, the random numbers are received through an interface or are stored on the device 102 (e.g., in memory).

In some implementations, the device 104 includes a decryption engine 108 for decrypting ciphertext or digital signatures received from device 102. The devices 102 and 104 can include both encryption and decryption engines, 106, 108, for bi-directional communication. In the example shown, the devices 102, 104, can perform a variety of cryptographic processes, including but not limited to: elliptic curve encryption/decryption, elliptic curve digital signature generation and authentication, etc.

Although the cryptographic processes described herein are related to elliptic curves, the disclosed implementations can be used with any cryptographic processes that perform field operations where it is desirable to mask secret material that could be derived from analyzing the operating environment of the field operations.

In some implementations, the same domain parameters (e.g., selected curve, group order, etc.) are shared by both devices 102, 104.

In some implementations, device 102 can be a smart card that is in the process of authenticating its holder to device 104, which can be a mainframe computer located at a bank, for example. A smart card, which may also be referred to as a chip card or an integrated circuit card (ICC), is generally a pocket sized card (e.g., a credit card sized card) that can include embedded integrated circuits that hold and/or process information. The smart card may also include specific security logic. The stored and/or processed information can be secure information specific to its holder (e.g., a bank account number) that can be used to process a requested transaction by the user (e.g., a withdrawal from their bank account). The security logic can be used to protect the transmission of the user specific information between device 102 and device 104.

In some cases, a hacker may monitor the communications between device 102 and device 104 by eavesdropping on the unsecured channel 110. The hacker may have the capability to read all data transmitted over the channel, to modify transmitted data, and to inject other data into the transmission for their own benefit. For example, the hacker may attempt to read a message from sending device 102 to receiving device 104 to obtain personal information about the sender of the message (e.g., bank account number, credit card number, etc.). The hacker may also attempt to impersonate either device 102 or device 104 in the communication channel to perform certain activities that would be requested or performed by either device (e.g., withdraw money from a bank account, order merchandise to be charged to a credit card, etc.).

In other cases, a hacker may try to analyze the operating environments of the devices 102 and 104 to determine secret keying material. These attacks are often referred to as "side-channel" attacks. Some examples of side-channel attacks include power analysis attacks (e.g., simple or differential) and electromagnetic analysis attacks.

Power analysis attacks measure power consumption of a cryptographic device, such as a smart card that draws power from an external, untrusted source. Secret keying material can be determined directly by examining a power trace from a single secret key operation. Elliptic curve point multiplication algorithms are particularly vulnerable to these types of attacks because formulas for adding and doubling points may have power traces which can be distinguished from other operations.

Electromagnetic analysis attacks measure electromagnetic (EM) signals induced by the flow of current through CMOS devices, which can be collected by placing a sensor close to the device while the device is performing cryptographic operations. The EM signals can be analyzed to determine which instructions are being executed and contents of data registers.

Therefore, a need may arise for secure communications between device 102 and device 104, for securing the operating environments of devices 102 and 104, and for performing these secure communications in a timely fashion. The former can be defended against using known encryption techniques. These techniques can be implemented using elliptic curves in the cryptographic process.

Modulo Arithmetic

The efficient implementation of field arithmetic in an elliptic curve system can be a factor in reducing the time taken to perform the cryptographic process. Elliptic curves can include a finite set of elements, which can include large numbers (e.g., greater than 512 bits), which can be combined using modular arithmetic. Modular arithmetic is a process for reducing a number modulo another number that can involve a multitude of multi-precision floating point division operations. Modular reduction can be defined by the equation:

$$r = U \bmod M \equiv U - \lfloor U/M \rfloor * M$$

where $U$ is the number to be reduced modulo M, r is the residue value found which is congruent to $U$ for modulus M, and the symbol $\lfloor \alpha \rfloor$ represents the floor function (the largest integer $\leq a$) so that $\lfloor U/M \rfloor$ corresponds to integer division. The numbers, $U$ and M can be multiword size values (e.g., a word size can be 32 bits). The calculation of r can be performed in two steps. The first step can determine the quotient:

$$q = \lfloor U/M \rfloor$$

where q is the quotient and $U$ is the number to be reduced modulo M. The second step can determine the remainder, or residue value, r:

$$r = U - q*M$$

Barrett Reduction Method

The Barrett reduction method involves computing the modulo of a number $U$ by a modulus M, where a scaled integer estimate of the reciprocal of the modulus, which can be referred to as the Barrett constant, can be pre-calculated, and division operations can be replaced with multiplications and shifts, in order to estimate the quotient. The selection of the parameters used with the Barrett reduction method can keep the error in the quotient estimate to at most two. The use of the Barrett reduction method can help reduce the time needed to perform modular arithmetic, especially under conditions when many reductions are performed with a single modulus, as is the case in elliptic curve cryptography.

The Barrett reduction method can calculate an approximation of the quotient, q, faster than many methods that do not use the Barrett reduction method. In some implementations, a base, b, can be set equal to two. In some implementations, the base, b, can be set equal to a power of two that can correspond to the machine word size of the semiconductor device (e.g., microcontroller, microprocessor, etc) executing the method. A number to reduce, x, can be expressed in base b by the following equation:

$$x = (x_{2k-1} \ldots x_1 x_0)_b$$

where $$0 \leq x \leq b^{2k}$$

$$k = \lfloor \log_b m \rfloor + 1$$

and m is the modulus. The modulus, m, can be expressed in base, b, by the following equation:

$$m = (m_{k-1} \ldots m_1 m_0)_b$$

where $m_{k-1}$ is not equal to zero.

A Barrett constant, R, can be calculated using the following equation:

$$R = \lfloor b^{2k}/m \rfloor$$

The quotient approximation, $\hat{q}$, i.e., an approximate base quotient, can be calculated using the following equation:

$$\hat{q} = \lfloor \lfloor x/b^{(k-1)} \rfloor * \lfloor b^{2k}/m \rfloor b^{k-1} \rfloor$$

The quotient approximation, $\hat{q}$, can verify that $q-2 \leq \hat{q} \leq q$. The remainder approximation, $\hat{r}$, can be calculated using the following equation:

$$\hat{r} = x - \hat{q} * m.$$

The remainder approximation, $\hat{r}$, can be corrected by subtracting the modulus, m, from $\hat{r}$ until the value of the remainder approximation, $\hat{r}$, is less than the value of the modulus, m.

The methods disclosed in this document can use a modified form of the Barrett reduction method to calculate the quotient approximation, $\hat{q}$, using the following equation:

$$\hat{q} = \left\lfloor \frac{\left\lfloor \frac{U}{2^{n+\beta}} \right\rfloor * \left\lfloor \frac{2^{n+\alpha}}{N} \right\rfloor}{2^{\alpha-\beta}} \right\rfloor$$

where $2^{n-t} \leq N < 2^n$, $U < 2^{n+y}$, t is equal to the machine word size (in number of bits) or one if the machine words on a bit basis, n is the length of the special form of the modulus (in machine words), y is selected so that $U < 2^{n+y}$ and $U$ has a maximum size of (n+y) bits, and $\alpha$ and $\beta$ are two parameters that can be multiples of the machine word and selected to determine the degree of accuracy desired for the reduction method.

For example, typical values for the parameters can be $y = n+t$, where $U < 2^{2n}+t$. In this example, the size of $U$ is twice the size of the modulus, m, plus an additional machine word (2n+t). It follows that α=n+t, and β=−t. The quotient approximation, q^, can be calculated using the following equation:

$$q\char`^ = \left\lfloor \frac{\left\lfloor \frac{U}{2^{(n-t)}} \right\rfloor * \left\lfloor \frac{2^{(2n+t)}}{N} \right\rfloor}{2^{n+2t}} \right\rfloor$$

The methods disclosed in this document can use the modified Barrett formula where the special form of the modulus can simplify the calculations needed for the quotient approximation, q^. The simplified calculations can reduce the amount of error contributed to the quotient approximation, q^. The additional error to the quotient approximation, q^, though reduced, can contribute to the calculation of the remainder approximation, r^. In some implementations, the method of successive subtraction can be used to calculate the exact remainder. This may require the use of more subtraction operations. In some implementations, if the remainder can remain as a congruency, or if the remainder can be randomized the calculation of the remainder approximation, r^, can be used on the larger initial error on the approximated quotient, q^. An example randomization is disclosed in U.S. Pat. Pub. No. 2005/0105723; other randomization techniques can also be used. Therefore, remainder approximation, r^, can be calculated using the following equation r^=$U$−q^*N.

Use of a special form of the modulus in the Barrett reduction method can result in a special form of the Barrett constant. Operations in the Barrett reduction method can be modified and simplified due to the use of the special form of the constant. The use of this modified Barrett reduction method can further reduce the time it takes for an overall cryptographic process.

Referring to the description of FIG. 1, "side-channel" attacks can include analysis of the overall cryptographic process to determine instructions executed and data register contents, for example. The use of the modified Barrett reduction method can introduce a change in the pattern of the modular arithmetic that can make it difficult for a hacker to analyze, and therefore determine any secret keying material. U.S. Pat. Pub. No. 2005/0105723 and PCT application PCT/US2006/012795, the disclosures of which are incorporated herein by reference, provide example randomizations and polynomials that can be used for a modified Barrett reduction method with quotient randomization that can result in a change of patterns that can make it difficult for a hacker to analyze. Other techniques can also be used.

Computing the Modulus of a Number Modulo Another Number

Figure 2:
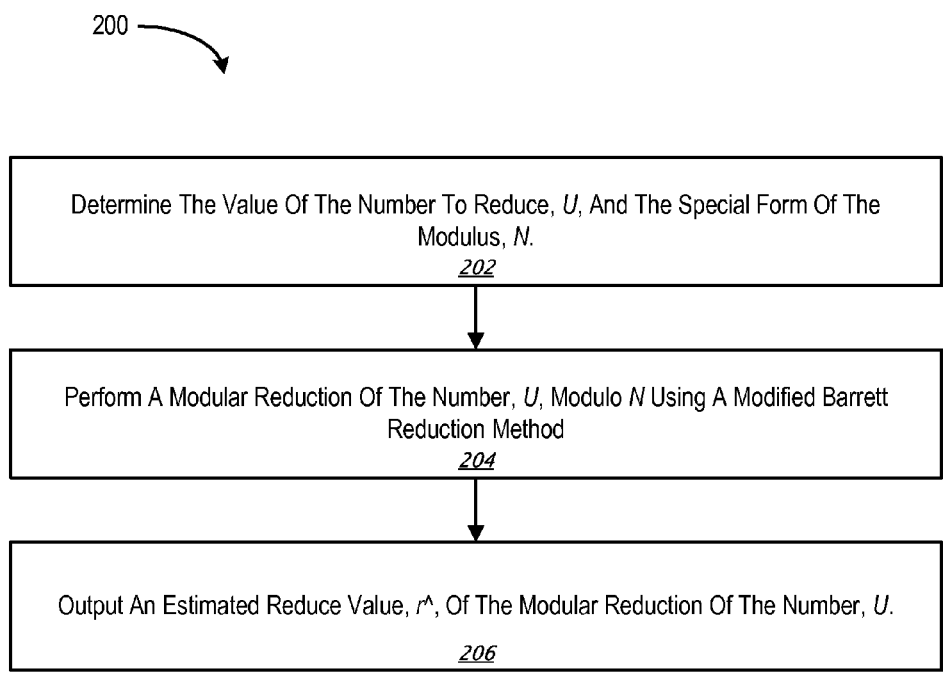
FIG. 2 is a flow diagram of a process to compute the modulus of a number modulo another number.

FIG. 2 is a flow diagram of a process 200 to compute the modulus of a number, $U$, modulo another number, N. The number, N, can be a special form of the modulus. The process 200 begins by determining the value of the number to reduce, $U$, and the special form of the modulus, N (step 202). A modular reduction of the number, $U$, modulo N is performed using a modified version of the Barrett reduction method (step 204). An estimated reduced value, r^, is output (step 206). The process 200 ends.

The process 200 can be based on the use of the modified Barrett reduction method where the modulus and the Barrett constant are of special forms, resulting in modifications to the method that can reduce and simplify calculations. The fewer and simpler calculations can decrease the amount of time it takes to perform the modular reduction of a number. Calculations in elliptic curve cryptography (e.g., the elliptic curve digital signature algorithm (ECDSA) described in more detail with reference to FIG. 4) can include many mathematical calculations (e.g., addition, subtraction, multiplication) that involve modular arithmetic. Therefore, the reduction in the time it takes to perform modular arithmetic can result in an overall decrease in time for the cryptographic process. The process 200 can be performed in an elliptic curve cryptographic process that uses elliptic curves on a prime field ($F_p$), on a binary field ($F_2^m$), or on an extension field($F_p^m$).

Special Form of the Modulus When Using Elliptic Curves on a Prime Field

In some implementations where elliptic curves on a prime field ($F_p$) are used, the special form of the modulus, N, can be defined by a difference equation:

$$N=2^m-F$$

where m is the number of bits in the modulus, and a value, p, can be a number, p<=m−1. The value, F, can be defined as $F<2^p$.

In other implementations, the special form of the modulus, N, can be defined by the sum equation:

$$N=2^m+F$$

where m is the number of bits in the modulus, and a value, p, can be a number, p<=m−1. The value, F, can be defined as $F<2^p$.

Examples of some special forms of the modulus can be the moduli defined by the Federal Information Processing Standards (FIPS) 186-2 standard. This standard recommends elliptic curves over five prime fields. The primes have the common property that they can be written as the sum or difference of a small number of powers of 2. The powers of 2 can be multiples of 32, which can yield reduction algorithms that are especially fast on machines with a word size of 32 bits. For example, a modulus included in the FIPS 186-2 standard can be expressed by the special form of the modulus difference equation:

$$N=2^m-F$$

where m=192, and F=$2^{64}$+1. Both 192 and 64 are multiples of 32. The value of p can be determined by $F<2^p$, and p<=m−1. Therefore, $2^{64}+1<2^p$, and p<=192−1, so p can be chosen to be greater than or equal to 65 or less than or equal to 191. The smaller the value of p, the fewer the number of calculations needed to perform the modulus arithmetic. However, for practical reasons, the value of p can be selected as a multiple of the machine word size of the microprocessor or microcontroller (e.g., 8, 16, or 32 bits). The use of fewer calculations can decrease the time needed to perform the modular arithmetic.

Estimate of the Quotient

An estimate of the quotient, q, of a number, $U$, reduced modulo, N, where N is a special form of the modulus as described above, can written as:

$$q\char`^ = \left\lfloor \frac{\left\lfloor \frac{U}{2^{n+\beta}} \right\rfloor * \left\lfloor \frac{2^{n+\alpha}}{N} \right\rfloor}{2^{\alpha-\beta}} \right\rfloor$$

where $2^{n-t}<=N<2^n$, $U<2^{n+y}$, t is equal to the machine word size (in number of bits) or one if the machine works with bits, n is the length of the special form of the modulus (in bits), $y$ is selected so that $U<2^{n+y}$ and $U$ has a maximum size of (n+$y$ bits, and α and β are two parameters that can be multiples of the machine word and selected to determine the degree of accuracy desired for the reduction method. A constant, R, which can be referred to as the Barrett constant, can be calculated, where:

$$R = \left\lfloor \frac{2^{n+\alpha}}{N} \right\rfloor$$

and a value, $QU$, can be calculated, where:

$$QU = \left\lfloor \frac{U}{2^{n+\beta}} \right\rfloor$$

The quotient approximation can now be expressed as:

$$q\hat{} = \left\lfloor \frac{QU * R}{2^{\alpha-\beta}} \right\rfloor$$

Special Form of the Barrett Constant

The special form of the modulus, N, can be used to calculate the Barrett constant, which can result in a special form of the Barrett constant, R, where:

$$R = 2^{n+\alpha-m} + E = 2^h + E$$

and $E<2^s$, and h=n+α−m. Also, $$2^{n+\alpha} = N*R + A$$

where A<N. It can follow that:

$$2^{n+\alpha} = (2^m - F)*(2^{n+\alpha-m} + E) + A$$

and $$2^{n+\alpha} = 2^{n+\alpha} - F*2^{n+\alpha-m} + E*(2^m - F) + A;$$

$$-F*2^{n+\alpha-m} + E*(2^m - F) + A = 0$$

and $$E = \frac{(F * 2^{n+\alpha-m} - A)}{(2^m - F)}$$

where, as described above for the special form of the modulus, $F<2^p$ and p<=m−1. It can then follow that $F<2^{m-1}$, $-F>-2^{m-1}$, $2^m - F > 2^m - 2^{m-1}$, and $$\frac{1}{(2^m - F)} < \frac{1}{(2^{(m-1)})}$$

since $F<2^p$ then, $$F * 2^{n+\alpha+m} < 2^{p+n+\alpha-m}$$

and $$E < \frac{(2^{p+n+\alpha-m} - A)}{2^{m-1}} <= \frac{(2^{p+n+\alpha-m})}{2^{m-1}}$$

and $$E < 2^{p+\alpha+n-2*m+1}$$

It can follow that the value for s, where $E<2^s$, is at most:

$$s = p+\alpha+n-2*m+1.$$

This calculation can show that the difference between the maximum power (e.g., the value of s) and the second power is roughly the same for N and R, such that $N=2^m-F$, with $F<2^p$, and the difference of the power is m−p. For $$R = 2^{n+\alpha-m} + E$$

and $E<2^s$, the difference between the powers is n+α−m−s=m−p−1.

Dividing the Quotient Into a High Term and a Low Term

Using the special form of the Barrett constant can simplify the calculations used to determine the estimate of the quotient, q̂. The value, $QU$, can be divided into two terms as shown in the following equation:

$$QU = 2^u * QU\text{High} + QU\text{Low}$$

where $$QU\text{High} = \left\lfloor \frac{QU}{2^u} \right\rfloor$$

where $u$ is the size, in bits, of $QU$Low and $$QU_{\text{Low}} < 2^u$$

$$QU = 2^u * QU\text{High} + QU\text{Low}$$

$$R = 2^{n+\alpha-m} + E = 2^h + E$$

It can follow, referring to the equation of the estimate of the quotient, q̂, above using the special form of the constant:

$$q\hat{} = \left\lfloor \frac{QU * R}{2^{\alpha-\beta}} \right\rfloor$$

that the estimate of the quotient, q̂, can also be expressed as:

$$q\hat{} = \left\lfloor \frac{(2^u * QU\text{High} + QU\text{Low}) * (2^h + E)}{2^{\alpha-\beta}} \right\rfloor$$

$$q\hat{} = \left\lfloor \frac{(QU * 2^h + 2^u * QU\text{High} * E + QU\text{Low} * E)}{2^{\alpha-\beta}} \right\rfloor$$

For example, for three values, a, b, and c, if a>0, b>0, and c>0, then a property of a floor function can be represented as:

$$\left\lfloor \left(\frac{(a+b)}{c}\right) - 1 \right\rfloor <= \left\lfloor \frac{a}{c} \right\rfloor + \left\lfloor \frac{b}{c} \right\rfloor <= \left\lfloor \frac{(a+b)}{c} \right\rfloor$$

A value can be chosen for u such that $Q\mathcal{U}Low$, which is the smaller term of the two term estimate of the quotient, $\hat{q}$, contributes less to the error in the calculation of the estimate of the quotient, $\hat{q}$.

$$\frac{QULow*E}{2^{\alpha-\beta}} < Epsilon1 = 2^{e1}$$

The value of Epsilon1 can be kept small such that:

$$QULow < Epsilon1 * \frac{2^{\alpha-\beta}}{E}$$

with $E<2^s$. It can then follow that $1/2^s<1/E$, and $Epsilon1=2^{e1}$, which can also be expressed as $e1=\log_2(Epsilon1)$. The value, u, can be selected such that $$2^u <= 2^{\alpha-\beta-s-e1}$$

It then can follow that:

$$QULow < 2^u <= 2^{\alpha-\beta-s+e1} < Epsilon1 * \frac{2^{\alpha-\beta}}{E}$$

where the condition of the equation is verified if we select $$u <= \alpha-\beta-s+e1$$

In some implementations, the value, u, remaining within its constraints, can be selected to be as large as possible. In other implementations, the value, u, remaining within its constraints, can be a multiple of the machine word size, t. An approximated quotient, $\hat{q2}$, can be represented by the following equation:

$$\hat{q2} = \left\lfloor \frac{(QU*2^h + 2^u * QUHigh*E)}{2^{\alpha-\beta}} \right\rfloor$$

Using the property of the floor function described above, the estimate of the quotient, $\hat{q}$, can be represented as:

$$\hat{q}-1 <= \hat{q2} + \left\lfloor \frac{(QULow*E)}{2^{\alpha-\beta}} \right\rfloor <= \hat{q}$$

Taking into consideration the follow equations:

$$0 <= \frac{QULow*E}{2^{\alpha-\beta}} < Epsilon1$$

$$0 <= \left\lfloor \frac{QULow*E}{2^{\alpha-\beta}} \right\rfloor <= \lfloor Epsilon1 \rfloor$$

$$-\lfloor Epsilon1 \rfloor <= -\left\lfloor \frac{QULow*E}{2^{\alpha-\beta}} \right\rfloor <= 0$$

it can follow that:

$$\hat{q}-\lfloor Epsilon1 \rfloor - 1 <= \hat{q2} <= \hat{q}$$

To simplify the calculation of $\hat{q2}$, it can be calculated in two parts:

$$\hat{q3} = \left\lfloor \frac{(QU*2^h)}{2^{\alpha-\beta}} \right\rfloor + \left\lfloor \frac{QUHigh*E}{2^{\alpha-\beta}} \right\rfloor$$

and $$\hat{q2}-1 <= \hat{q3} <= \hat{q2}$$

The calculation of $\hat{q3}$ can result in an approximated quotient with the property:

$$\hat{q}-\lfloor Epsilon1 \rfloor -2 <= \hat{q3} <= \hat{q}$$

The quotient approximation, $\hat{q3}$, can be used in place of the quotient approximation, $\hat{q}$, in the modified Barrett reduction method when using elliptic curves on a prime field ($F_p$). The value of the quotient approximation, $\hat{q3}$, can be less than the value of the quotient approximation, $\hat{q}$, which can result in a larger error in the estimated quotient. However, this error can be reduced by selecting the value of Epsilon1 to be sufficiently small.

An approximate remainder, $\hat{r3}$, can be calculated with the quotient approximation, $\hat{q3}$, using the following equation:

$$\hat{r3} = \mathcal{U} - \hat{q3}*N$$

The remainder approximation, $\hat{r3}$, may not be normalized (i.e., greater than of equal to the modulus) but is congruent to the resulting quotient. A modulo reduction of the value, $\mathcal{U}$, can be performed taking into account the larger initial error in the approximated quotient. One example method is disclosed in U.S. Pat. Pub. No. 2005/0105723; other methods can also be used.

Methods for Calculating the Values of the High Term and the Low Term

In some implementations, the first term of $\hat{q3}$ can be calculated by performing a shift and truncate operation, simplifying the calculation of the estimate of the quotient, $\hat{q}$. In other implementations, the calculation can be further simplified by selecting $-\beta$ to be a multiple of the machine word size, t. The second term of $\hat{q3}$ can be calculated by performing a multiply with truncate. This multiply with truncate can be a simpler operation than the operation if it were performed on the entire quotient. The multiplication can additionally be reduced when $Q\mathcal{U}High$ and E are small values. The simplification of many of the operations involved in the Barrett reduction method can result in reduced calculation times for modulus arithmetic.

In some implementations, the selection of the values for $\alpha$ and $\beta$ can be based on the limit on the error on the quotient, $\hat{q}$, and the complexity of the computations to evaluate the quotient, e.g., such as previously described.

Implementation of a Modified Barrett Reduction Process

Figure 3:
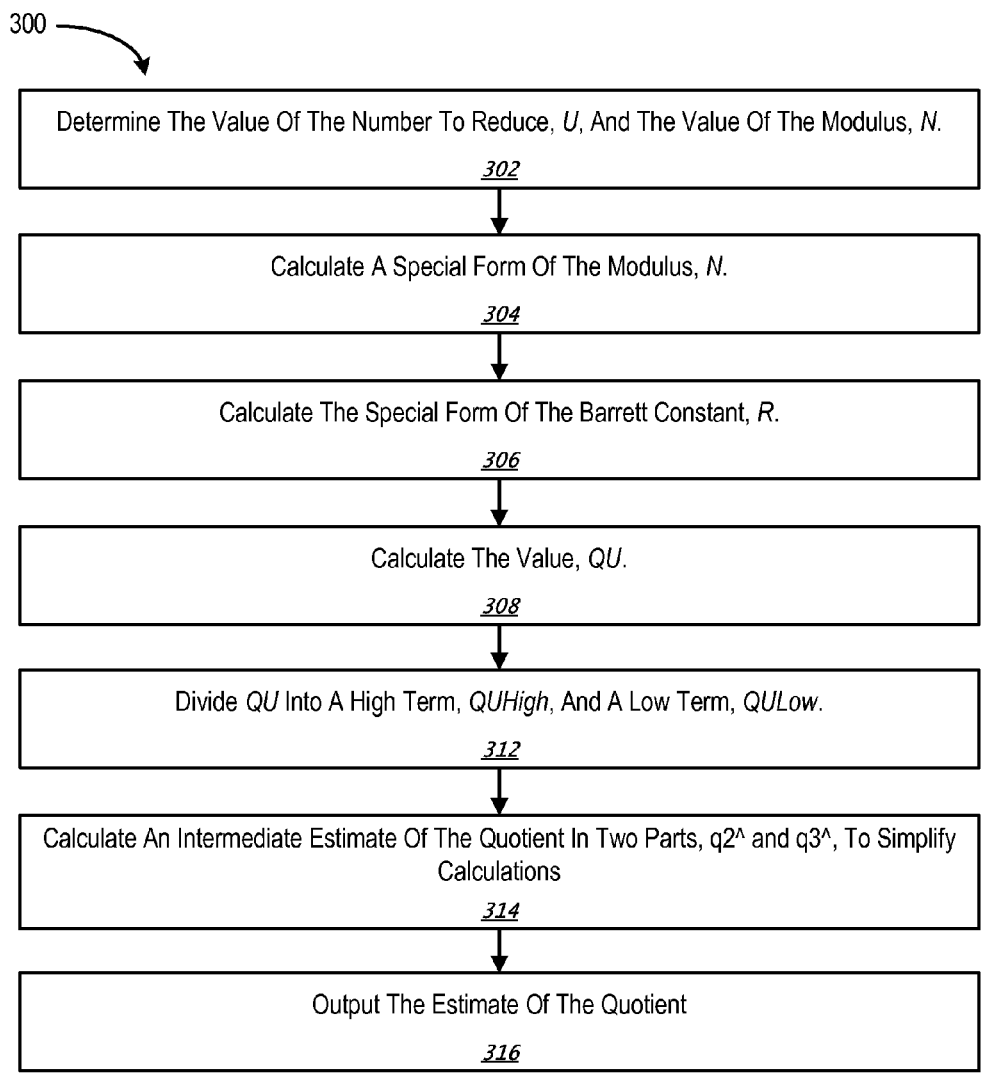
FIG. 3 is a flow diagram of an implementation of a modified Barrett reduction process that includes the use of a special form of the modulus.

FIG. 3 is a flow diagram of an implementation of a modified Barrett reduction process 300 that includes the use of a special form of the modulus. In an implementation of the process 300 that uses elliptic curves on a prime field ($F_p$), the process 300 begins by determining a number to reduce, $\mathcal{U}$, and the modulus, N, to reduce the number by (step 302). A special form of the modulus, N, is then calculated (step 304) using the equations described above. Also using the equations described above, the special form of the Barrett constant, R, is calculated (step 306); the value, $Q\mathcal{U}$, is calculated (step 308); the value, $Q\mathcal{U}$, is divided into high term, QHigh, representing upper order bits of the value, $QU$, and a low term, $QU$Low, representing lower order bits of the value, $QU$ (step 312); an intermediate value of the estimated quotient, $q3\hat{}$, is calculated to simplify the calculations to determine $U$ modulo N (step 314); and the calculation of $q3\hat{}$ gives the estimate of the quotient, $q\hat{}$ (step 316). The process 300 ends.

Special Form of the Modulus When Using Elliptic Curves on a Binary Field

In some implementations of the process 200 of FIG. 2, where elliptic curves on a binary field ($F_2^m$) are used, the special form of the modulus, N, can be defined by a difference equation:

$$N = X^m - F$$

where X is a polynomial, and is m is the number of bits in the modulus. A value, p, can be a number, $p \leq m-1$. The value, F, can be defined as $\deg(F) < p$.

In other implementations, the special form of the modulus, N, can be defined by the sum equation:

$$N = X^m + F$$

where m is the number of bits in the modulus. A value, p, can be a number, $p \leq m-1$. The value, F, can be defined as $\deg(F) < p$.

Estimate of the Quotient

An estimate of the quotient, q, of a number, U, reduced modulo, N, where N is a special form of the modulus as described above can written as:

$$q\hat{} = \left\lfloor \frac{\left\lfloor \frac{U}{X^{(n+\beta)}} \right\rfloor * \left\lfloor \frac{X^{(n+\alpha)}}{N} \right\rfloor}{X^{(\alpha-\beta)}} \right\rfloor$$

where $n-t \leq \deg(N) \leq n-1$, $\deg(U) < n+y$, t is equal to the machine word size (in number of bits) or the value one if the machine works with bits, n is the length of the special form of the modulus (in bits), y is a value such that $\deg U < n+y$, and $U$ can have a maximum size of $(n+y)$ bits, and $\alpha$ and $\beta$ are two parameters that can be multiples of the machine word and selected to determine the degree of accuracy desired for the reduction method. The equations for the Barrett reduction method can be similar to the equations for an elliptic curve in a prime field ($F_p$), which were described above, substituting the value 2 in the equations for the prime field with the value X and with polynomial quotient calculations.

$$U = QU * X^{n+\beta} + RU$$

$$\deg(RU) < n+\beta,$$

$$\deg(QU) = y - \beta$$

$$X^{n+\alpha} = QN * N + RN$$

$$\deg(RN) < \deg(N) \leq n-1$$

$$\deg(QN) = n + \alpha - \deg(N)$$

$$U = Q * N + R$$

$$\deg(R) < \deg(N) \leq n-1$$

$$\deg(Q) = n + y - \deg(N)$$

$$QU * QN = q\hat{} * X^{\alpha-\beta} + R\hat{}$$

$$\deg(R\hat{}) < \alpha - \beta$$

$$\deg(q\hat{}) = y + n - \deg(N)$$

Special Form of the Barrett Constant

In a similar manner as the modulus for elliptic curves in a prime field, ($F_p$), the modulus for elliptic curves in a binary field ($F_2^m$) also has a special form of the Barrett constant, QN. The special form of the modulus, N, can be used to calculate the Barrett constant, which can result in a special form of the Barrett constant, QN, where:

$$QN = X^{n+\alpha-m} + E = X^h + E$$

and $\deg(E) < s$, and $h = n + \alpha - m$.

Dividing the Quotient Into a High Term and a Low Term

Using the special form of the Barrett constant can simplify the calculations used to determine the estimate of the quotient, $q\hat{}$. The value, $QU$, can be divided into two parts as shown in the following equation:

$$QU = X^u * QU\text{High} + QU\text{Low}$$

where $$\deg(QU\text{High}) = \deg(QU) - u = y - \beta - u$$

where u is the size, in bits, of $QU$Low, and $$\deg(QU\text{Low}) < u$$

$$QU = X^u * QU\text{High} + QU\text{Low}$$

$$QN = X^{n+\alpha-m} + E = X^h + E$$

$$QU * QN = (X^u * QU\text{High} * QU\text{Low}) * (X^h + E)$$

$$QU * QN = QU * X^h + X^u * QU\text{High} * E + QU\text{Low} * E$$

The value, $QU * QN$, can be divided by $X^{\alpha-\beta}$ to determine the estimate of the quotient, $q\hat{}$. If it has minimal impact on the estimate of the quotient, $q\hat{}$, the third part of the sum, $QU * QN$, may not be calculated at all. Eliminating a calculation can contribute to a reduction in the time it takes to perform the modular reduction.

A value can be chosen for u such that $QU$Low, which is the smaller term of the two term estimate of the quotient, $q\hat{}$, contributes less to the error in the calculation of the estimate of the quotient, $q\hat{}$. With $\deg(E) < s$, and $\deg(E) \leq s-1$, $$\deg(QU\text{Low} * E) < \alpha - \beta + \text{Epsilon1}$$

$$\deg(QU\text{Low}) + \deg(E) < \alpha - \beta + \text{Epsilon1}$$

A value for u can be selected such that:

$$u \leq \alpha - \beta + \text{Epsilon1} - s + 1$$

where the condition $\deg(QU\text{Low}) < u$ is verified.

For elliptic curves on a binary field, ($F_2^m$), the floor function, $\lfloor \alpha \rfloor$, indicates that the divisions performed in the equations are polynomial divisions.

$$q3\hat{} = \left\lfloor \frac{(QU * X^h)}{X^{(\alpha-\beta)}} \right\rfloor + \left\lfloor \frac{(QU\text{High} * E)}{X^{(\alpha-\beta)}} \right\rfloor$$

The first term of the quotient approximation, q3^, can be calculated using simple shift and truncate operations. The calculations can be further simplified if the value of $\beta$ is selected to be a multiple of the machine word size, t.

The second term of the quotient approximation, q3^, can be calculated using a multiply with a truncate. The multiply with a truncate is a less complicated operation that the calculations used to determine the quotient approximation, q^. The multiply with a truncate can be further simplified if the values of Q$U$High and E are selected to be small.

The quotient approximation, q3^, can be used in place of the quotient approximation, q^, in the modified Barrett reduction method for elliptic curves on a binary field, ($F_2^m$). The value of the quotient approximation, q3^, can be less than the value of the quotient approximation, q^, which can result in a larger error in the estimated quotient. However, this error can be reduced by selecting the value of Epsilon1 to be sufficiently small.

The remainder approximation, r3^, can be calculated with the quotient approximation, q3^, using the following equation:

$$r3\hat{} = U - q3\hat{}*N$$

The remainder approximation, r3^, may not be normalized (i.e., greater than of equal to the modulus) but is congruent to the resulting quotient. A modulo reduction of the value, $U$, can be performed taking into account the larger initial error in the approximated quotient, e.g., such as described in U.S. Pat. Pub. No. 2005/0105723, or by other techniques.

Elliptic Curve Digital Signature Algorithm (ECDSA)

In some implementations, a digital signature algorithm (DSA) can be used in an elliptic curve based public key cryptographic system. An Elliptic Curve Digital Signature Algorithm (ECDSA) is the elliptic curve analogue of the DSA. ECDSA can be used by trusted certification authorities to sign certificates that can bind together a device and its public key.

An ECDSA can include four algorithms that can be used to generate the digital signature for a plaintext message m. The first algorithm can be a domain parameter generation algorithm that can generate a set, D, of domain parameters. The domain parameters D can include the following parameters: q, the field order; E, the elliptic curve equation (e.g., a and b in equation $y^2=x^3+ax+b$); a point, P, in $E(F_p)$; the order, n, of P; and cofactor, h, where h=#$E(F_p)$/n, and #$E(F_p)$ is the number of points in the elliptic curve, E.

The second algorithm can be a key generation algorithm that can take a set of domain parameters, D, and generate a key pair (e.g., Q, d).

The third algorithm can be a signature generation algorithm that can take as input a set of domain parameters, D, a private key d, and a message m, and produce a signature $\Sigma$.

The fourth algorithm can take as input a set of domain parameters, D, a public key Q, a message m, and a signature $\Sigma$ and can accept or reject the signature $\Sigma$.

In an implementation of ECDSA, with reference to FIG. 1, a sender (e.g., device 102) can generate a signature and transmit it to a recipient (e.g., device 104) via an unsecured channel (e.g., channel 110). The recipient (e.g., device 104) can then verify the received signature.

The sender (e.g., device 102) can select a random number, k, from the interval [1, (n−1)]. The sender can then compute k.P=($x_1$, $y_1$), where ($x_1$, $y_1$) is a point on the elliptic curve, E, and k.P is a point multiplication operation. Point coordinate $x_1$ can be converted to an integer, $\overline{X}_1$. The sender can compute r=$\overline{X}_1$ mod n, where the modulus of a number $\overline{X}_1$ is calculated modulo n, resulting in the residue, r, and mod is a modulo operator.

If r is equal to zero, the sender begins the signature generation process again and selects a random number, k. If r is not equal to zero, the sender can compute a message digest, e=H(m), using a cryptographic hash function, H, where the message digest, e, can serve as a short fingerprint of plaintext message m. The sender can then compute the following equation for s, s=$k^{-1}$*(e+d*r) mod n. Again, modulo arithmetic can be performed. If s is equal to zero, the sender begins the signature generation process again and selects a random number, k. If s is not equal to zero, the sender can transmit signature (r, s) to the recipient.

The recipient (e.g., device 102) can verify the received signature (r, s), and either accept the signature or reject the signature. The recipient can verify that r and s are integers in the interval [1, n−1]. If either r or s, or both r and s are not in the interval [1, n−1], the verification will fail and the signature can be rejected. If r and s are in the interval [1, n−1], the recipient can then compute the message digest, e=H(m).

Next, the recipient can compute a value, w=$s^{-1}$ mod n, using modulo arithmetic. The recipient can then compute values, $u_1$ and $u_2$, where $u_1$=e*w mod n, and $u_2$=r*w mod n, again, using modulo arithmetic. The recipient can next compute a value, X, where X=$u_1$.P+$u_2$.Q. If X is equal to infinity, the signature can be rejected. If X is not equal to infinity, the recipient can convert the x coordinate ($x_1$) of the point, X, to an integer, $\overline{X}_1$. The recipient can compute a value, v, where v=$\overline{X}_1$ mod n, using modulo arithmetic. If v equals r, the signature can be accepted. If v is not equal to r, the signature can be rejected. The recipient can end the signature verification process.

Figure 4:
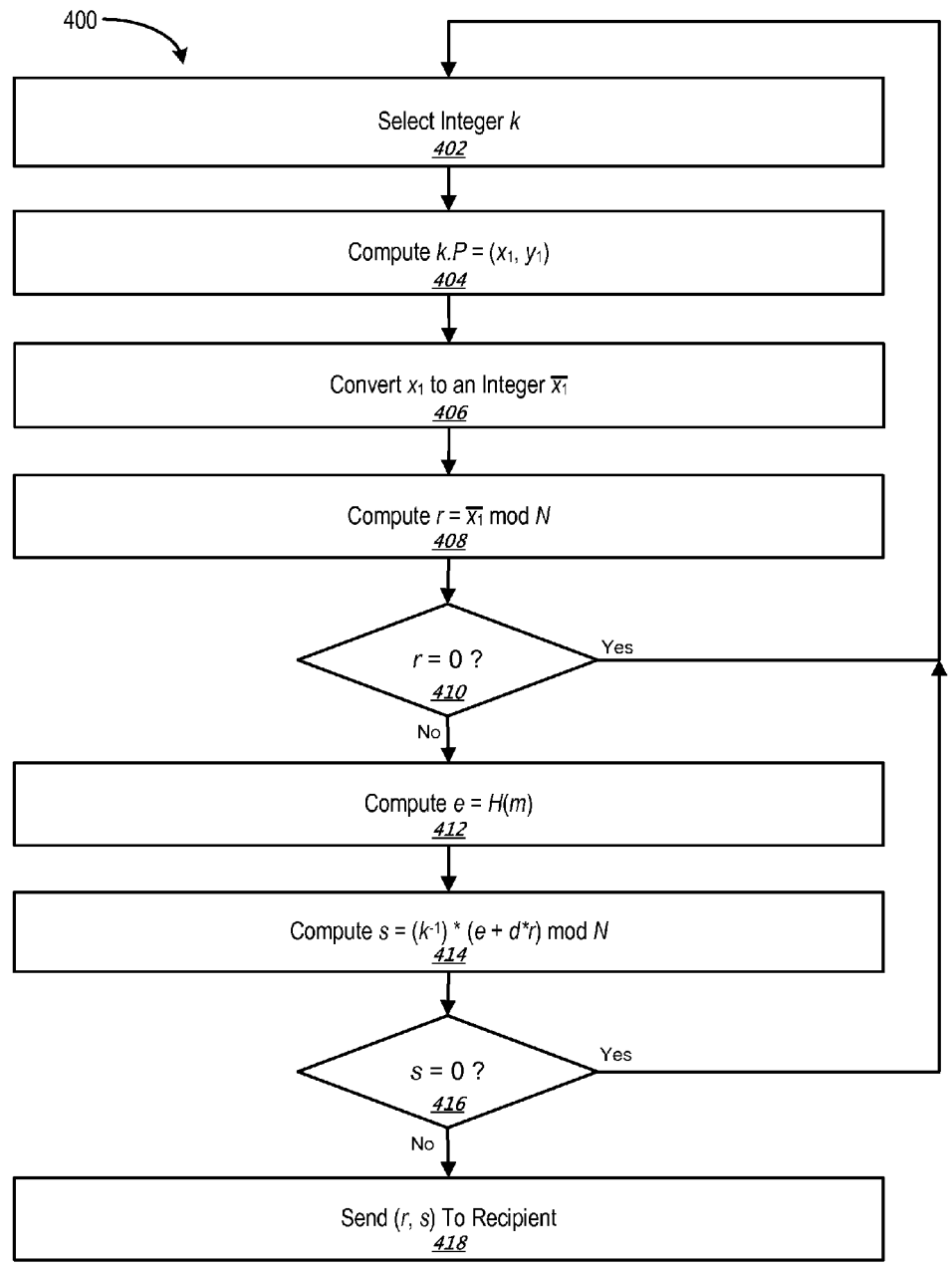
FIG. 4 is a flow diagram of an implementation of an elliptic curve digital signature generation process using the special form of the modulus in a modified Barrett reduction method for modulo arithmetic.

Elliptic Curve Digital Signature Generation $U$sing the Modified Barrett Reduction Method for Modular Arithmetic FIG. 4 is a flow diagram of an implementation of an elliptic curve digital signature generation process 400 using the special form of the modulus in a modified Barrett reduction method for modulo arithmetic. The process 400 begins when a sender (e.g., device 102) sends a message m to a recipient (e.g., device 104) which requires a digital signal from the sender for verification by the recipient. The benefits of using a digital signature for a message were previously described.

The sender can select a random number, k, from the interval [1, (n−1)] (step 402). Next, in the process 400, the sender can compute k.P=($x_1$, $y_1$), where ($x_1$, $y_1$) is a point on the elliptic curve E (step 404). Point coordinate $x_1$ can be converted to an integer, $\sqrt{}_1$ (step 406).

The sender can compute r=$\overline{X}_1$ mod N (step 408). The process 300 of FIG. 3 can be used to perform modulo arithmetic, using the special form of the modulus, N, and the modified Barrett reduction method described with reference to FIG. 2. If r is equal to zero (step 410), the sender begins the signature generation process again and selects a random number, k (step 402). If r is not equal to zero (step 410), the sender can compute a message digest, e=H(m), (step 412) using a cryptographic hash function, H, where the message digest, e, can serve as a short fingerprint of the message m being sent to the recipient (e.g., device 104) by the sender (e.g., device 102). The sender can then compute the following equation for s: s=$k^{-1}$*(e+d*r) mod N (step 414). The process 300 of FIG. 3 can be used to perform modulo arithmetic, using the special form of the modulus, N, and the modified Barrett reduction method described with reference to FIG. 2. If s is equal to zero (step 416), the sender begins the signature generation process again and selects a random number, k (step 402). If s is not equal to zero (step 416), the sender can transmit signature (r, s) along with the message to the recipient (step 418).

The recipient (e.g., device 102) can verify the received signature (r, s), and either accept the signature or reject the signature. This process was described above.

In some implementations, the equation of an elliptic curve can be on a binary field, $F_2^m$. The equation can be of the form:

$$y^2 + xy = x^3 + ax^2 + b, \text{ where } b \neq 0.$$

In this implementation, the elements of the finite field can be integers that have a length of, at most, m bits. The elements can be considered as a binary polynomial of degree m−1. Polynomial arithmetic can be used for addition, multiplication, division, and subtraction operations. This elliptic curve can be used in the implementations described in FIGS. 1-4.

The foregoing processes implement the use of a special form of the modulus in a modified Barrett reduction method in an ECC system. Other processes are possible, including processes with more or fewer steps. The steps of processes 200, 300 and 400 need not be performed serially in the order shown. The processes 200, 300 and 400 can be divided into multiple processing threads run by one or more processor cores and/or parallel processors.

System Architecture

Figure 5:
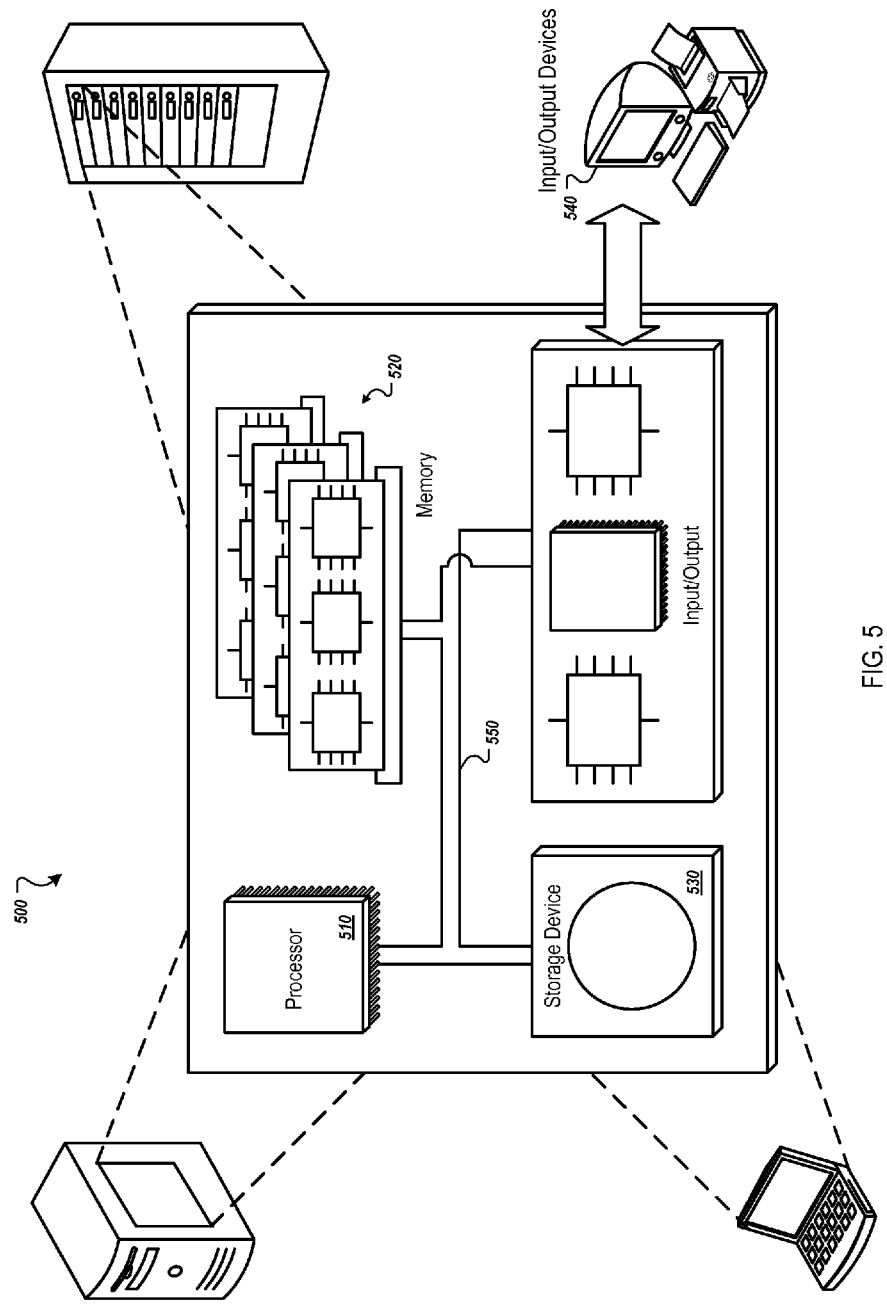
FIG. 5 is a block diagram of an implementation of a system for implementing the processes of FIGS. 2, 3, and 4.

FIG. 5 is a block diagram of an implementation of a system for implementing the processes of FIGS. 2, 3, and 4. For example, the system 500 may be included in device 102 and/or in device 104, described in reference to FIG. 1. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some implementations, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In another implementation, the memory 520 is a volatile memory unit. In yet another implementation, the memory 520 is a non-volatile memory unit.

The storage device 530 is capable of providing mass storage for the system 500. In some implementations, the storage device 530 is a computer-readable medium. In various different implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

In some implementations, the processes described in FIGS. 2, 3, 3 and 4 can be executed on a microcontroller that can include specialized circuitry for a cryptographic system. In some implementations of the microcontroller, circuitry may be included for protection against simple power analysis (SPA), differential power analysis (DPA), simple electromagnetic analysis (SEMA), and differential electromagnetic analysis (DEMA) attacks. The microcontroller may also implement the modified Barrett reduction method (FIG. 3) during message encryption to further prevent attacks, and decrease the overall speed of the cryptographic process.

For example, the microcontroller may be included on a smart card. An example of such a microcontroller can be the Atmel AT90SC6404RFT secure microcontroller for smart cards. The circuitry of the microcontroller and related circuitry on the smart card can include thousands of logic gates that switch on and off differentially depending upon the complexity of the operations being executed. The current consumption of the smart card is dependent on the gate switching which can be determined by the operation being executed. A hacker can monitor the power consumption of the smart card, and using statistical information, can deduce information about sensitive data when it is manipulated. Therefore, any changes to the manipulation of the sensitive data that may not be included in previously gathered statistical information can prevent an attack.

SPA can involve monitoring the current consumption curve of the smart card. DPA can use statistical information to amplify and reveal power consumption differences that may not be detectable with SPA. SEMA and DEMA can involve monitoring the electromagnetic emissions of the smart card. The current consumed by the smart card can create electromagnetic fields that can be measured using a special probe. These fields can be dependent on current consumption which varies depended upon the operations being executed on the smart card. Also the electromagnetic emissions from the smart card will vary by location on the card, depending upon what chip(s) are being used to execute the operations. By monitoring not only the electromagnetic emissions of the smart card but also their location, a hacker using statistical data and reverse engineering may be able to determine sensitive data.

The use of a special form of the modulus and a modified Barrett reduction method for modulus arithmetic can prevent a hacker from determining secret key values due to the modification of a standard process (e.g., the modified Barrett reduction method using a special form of the modulus can perform different computations that the standard Barrett reduction method). Also, if the hacker cannot determine when the actual cryptographic process is being performed, it will be even more difficult for the hacker to determine the sensitive data being transmitted. The use of the modified Barrett reduction method may enable a hacker, using any of the methods described above, from determining that an encryption process and transmission is even occurring.

A number of implementations have been described. Nevertheless, it will be understood that various modifications may be made. For example, elements of one or more implementations may be combined, deleted, modified, or supplemented to form further implementations. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A modular reduction method performed by an elliptic curve cryptography system that includes a processor and memory, the method using a modified form of a Barrett reduction method based on elliptic curves on a prime field comprising:

obtaining input specifying a first value U to reduce;
obtaining input specifying a modulus N, wherein the modulus N is of a special form;
performing a modular reduction of the first value U modulo the special form of the modulus N, wherein the modular reduction comprises:
calculating an estimated form of a first quotient $\hat{q}$ using the modulus of the special form N;
calculating an estimated form of a second quotient $\hat{q3}$;
substituting the estimated form of the first quotient $\hat{q}$ with the estimated form of the second quotient $\hat{q3}$;
calculating an estimated form of a remainder $\hat{r3}$; and
calculating an estimated reduced form of the first value U based on the estimated form of the second quotient $\hat{q3}$ and the estimated form of the remainder $\hat{r3}$.

2. The method of claim 1, wherein the special form of the modulus N is a modulus included in a Federal Information Processing Standards (FIPS) 186-2 standard.

3. The method of claim 1, wherein a special form of a Barrett constant R is calculated using the special form of the modulus N.

4. The method of claim 3, wherein the estimated form of the first quotient $\hat{q}$ contains a second value QU, wherein the second value QU is divided into a high term, QUHigh, and a low term, QULow.

5. The method of claim 4, wherein the second value, QU, is determined by an equation: $QU=2^u*QUHigh+QULow$, wherein a third value, u, represents the size, in bits, of QULow.

6. The method of claim 5, wherein QULow represents low order bits of QU, and QUHigh represents high order bits of QU.

7. The method of claim 6, wherein the low term, QULow, is calculated based on the third value, u, wherein the third value, u, is selected such that an error associated with the low term QULow and the calculation of the estimated form of the first quotient $\hat{q}$ is minimized.

8. The method of claim 7, wherein the estimated form of the first quotient $\hat{q}$ is calculated using the low term QULow and the high term QUHigh.

9. The method of claim 8, wherein the estimated form of the first quotient $\hat{q}$ includes a first parameter, $\alpha$, and a second parameter, $\beta$, wherein the a value for the first parameter, $\alpha$, and a value for the second parameter, $\beta$, are selected such that $\alpha=n+t$ and $\beta=-t$, wherein:
t is equal to a machine word size, in number of bits; and
n is equal to a length of the special form of the modulus, in machine words.

10. The method of claim 9, wherein the estimated form of the second quotient $\hat{q3}$ is expressed by an equation:

$$\hat{q3} = \left\lfloor \frac{(QU*2^h)}{2^{\alpha-\beta}} \right\rfloor + \left\lfloor \frac{QUHigh*E}{2^{\alpha-\beta}} \right\rfloor$$

wherein:
$\alpha$ and $\beta$ are multiples of a machine word;
h is based on the length of the special form of the modulus;
$E<2^s$; and
s is a maximum power value based on the use of the special form of the modulus.

11. The method of claim 1, wherein the estimated form of the remainder, $\hat{r3}$, is calculated using an equation:

$$\hat{r3}=U-\hat{q3}*N.$$

19

12. A modular reduction method performed by an elliptic curve cryptography system that includes a processor and memory, the method using a modified form of a Barrett reduction method based on elliptic curves on a binary field comprising:
   obtaining input specifying a first value U to reduce;
   obtaining input specifying a modulus N, wherein the modulus N is of a special form;
   performing a modular reduction of the first value U modulo the special form of the modulus N, wherein the modular reduction comprises:
      calculating an estimated form of a first quotient q^ using the modulus of the special form N;
      calculating an estimated form of a second quotient q3^;
      substituting the estimated form of the first quotient q^ with the estimated form of the second quotient q3^;
      calculating an estimated form of a remainder r3^; and
      calculating an estimated reduced form of the first value U based on the estimated form of the second quotient q3^ and the estimated form of the remainder r3^.

13. The method of claim 12, wherein the special form of the modulus N is a modulus included in a Federal Information Processing Standards (FIPS) 186-2 standard.

14. The method of claim 12, wherein a special form of a Barrett constant R is calculated using the special form of the modulus N.

15. The method of claim 14, wherein the estimated form of the first quotient q^ contains a second value QU, wherein the second value QU is divided into a high term, QUHigh, and a low term, QULow.

16. The method of claim 15, wherein the second value, QU, is determined by an equation: $QU=X^u*QUHigh+QULow$, wherein a third value, u, represents the size, in bits, of QULow and the value, X, represents a polynomial.

17. The method of claim 16, wherein QULow represents low order bits of QU, and QUHigh represents high order bits of QU.

18. The method of claim 17, wherein the low term, QULow, is calculated based on the third value, u, wherein the third value, u, is selected such that an error associated with the low term QULow and the calculation of the estimated form of the first quotient q^ is minimized.

19. The method of claim 18, wherein the estimated form of the first quotient q^ is calculated using the low term QULow and the high term QUHigh.

20. The method of claim 19, wherein the estimated form of the first quotient q^ includes a first parameter, $\alpha$, and a second parameter, $\beta$, wherein a value for the first parameter, $\alpha$, and a value for the second parameter, $\beta$, are selected such that $\alpha=n+t$ and $\beta=-t$, wherein:
   t is equal to a machine word size, in number of bits; and
   n is equal to a length of the special form of the modulus, in machine words.

21. The method of claim 20, wherein the estimated form of the second quotient q3^ is determined by an equation:

$$q3\char`\^= \left\lfloor \frac{(QU*X^h)}{X^{(\alpha-\beta)}} \right\rfloor + \left\lfloor \frac{(QUHigh*E)}{X^{(\alpha-\beta)}} \right\rfloor$$

wherein:
   $\alpha$ and $\beta$ are multiples of a machine word;
   h is based on the length of the special form of the modulus;
   X is a polynomial;
   $E<2^s$; and

20 s is a maximum power value based on the use of the special form of the modulus.

22. The method of claim 12, wherein the estimated form of the remainder is calculated using an equation:

$$r3\char`\^=U-q3\char`\^*N.$$

23. An apparatus comprising:
   an interface operable for obtaining an input value to reduce and a modulus; and
   an encryption engine operatively coupled to the interface; and
   one or more processors operatively coupled to the interface and the encryption engine, wherein the one or more processors generate a special form of the modulus using elliptic curves over a predetermined number of prime fields, and perform a modular reduction of the input value modulo the special form of the modulus, wherein performing the modulo reduction comprises:
      calculating an estimated form of a first quotient using the modulus of the special form;
      calculating an estimated form of a second quotient;
      substituting the estimated form of the first quotient with the estimated form of the second quotient;
      calculating an estimated form of a remainder; and
      calculating an estimated reduced form of the input value based on the estimated form of the second quotient and the estimated form of the remainder.

24. The apparatus of claim 23, wherein the modular reduction is performed using a modified form of a Barrett reduction method.

25. The apparatus of claim 24, wherein the estimated reduced form of the input value consists of a high term and a low term, and wherein the high term and the low term are used to form the estimated reduced form of the input value.

26. The apparatus of claim 25, wherein an output of the encryption engine is used to digitally sign a message.

27. An apparatus comprising:
   an interface operable for obtaining an input value to reduce and a modulus;
   an encryption engine operatively coupled to the interface; and
   one or more processors operatively coupled to the interface and the encryption engine, wherein the one or more processors generate a special form of the modulus using elliptic curves over a predetermined number of binary fields, and perform a modular reduction of the input value modulo the special form of the modulus, wherein performing the modulo reduction comprises:
      calculating an estimated form of a first quotient using the modulus of the special form;
      calculating an estimated form of a second quotient;
      substituting the estimated form of the first quotient with the estimated form of the second quotient;
      calculating an estimated form of a remainder; and
      calculating an estimated reduced form of the input value based on the estimated form of the second quotient and the estimated form of the remainder.

28. The apparatus of claim 27, wherein the modular reduction is performed using a modified form of a Barrett reduction method.

29. The apparatus of claim 28, wherein the estimated reduced form of the input value consists of a high term and a low term, and wherein the high term and the low term are used to form the estimated reduced form of the input value.

30. The apparatus of claim 29, wherein an output of the encryption engine is used to digitally sign a message.

31. The method of claim 1, wherein the special form of the modulus N is defined by a difference equation: $N=2^m-F$, wherein:

m is the number of bits in the modulus;

a value, p, is a number wherein $p<=m\ 1$; and $F<2^p$.

32. The method of claim 1, wherein the special form of the modulus N is defined by a difference equation: $N=2^m+F$, wherein:

m is the number of bits in the modulus;

a value, p, is a number wherein $p<=m-1$; and $F<2^p$.

33. The method of claim 12, wherein the special form of the modulus N is defined by a difference equation: $N=X^m-F$, wherein:

X is a polynomial;

m is the number of bits in the modulus;

a value, p, is a number wherein $p<=m-1$; and $\deg(F)<p$.

34. The method of claim 12, wherein the special form of the modulus N is defined by a difference equation: $N=X^m+F$, wherein:

X is a polynomial;

m is the number of bits in the modulus;

a value, p, is a number wherein $p<=m-1$; and $\deg(F)<p$.

* * * * *